United States Patent [19]
Komatsuki et al.

[11] Patent Number: 5,702,549
[45] Date of Patent: Dec. 30, 1997

[54] TIRE INCLUDING TIRE FABRIC AND PLY INCLUDING TIRE FABRIC

[75] Inventors: Masato Komatsuki, Takasago; Makoto Ishii, Toyota; Yukishige Adachi, Toyota; Keiichi Makino, Toyota; Shinichi Miyazaki, Kobe, all of Japan

[73] Assignee: Sumitomo Rubber Industries, Ltd., Hyogo, Japan

[21] Appl. No.: 350,015

[22] Filed: Nov. 29, 1994

[30] Foreign Application Priority Data

Nov. 30, 1993 [JP] Japan .................................. 5-299520

[51] Int. Cl.$^6$ .................................................. B60C 9/11
[52] U.S. Cl. ................ 152/548; 139/383 R; 152/563; 156/134; 428/58; 442/218
[58] Field of Search ................. 139/383 R, 384 R, 139/383 AA; 152/548, 563; 156/157, 134; 28/141; 428/58, 257; 442/218

[56] References Cited

U.S. PATENT DOCUMENTS

| | | | |
|---|---|---|---|
| 666,253 | 1/1901 | Aeberli | 139/383 R |
| 1,461,984 | 7/1923 | Pfeiffer | 139/383 R |
| 1,540,595 | 6/1925 | Braver. | |
| 2,425,575 | 8/1947 | Suloff. | |
| 2,740,430 | 4/1956 | Shutteworth | 139/383 R |
| 2,869,589 | 1/1959 | Perry | 139/383 R |
| 3,225,900 | 12/1965 | MaBean et al. | 139/383 AA |
| 3,685,551 | 8/1972 | Parshin et al.. | |
| 4,026,331 | 5/1977 | Lees et al. | 139/383 AA |
| 4,401,137 | 8/1983 | Cannon | 139/383 AA |
| 4,427,107 | 1/1984 | Roberts et al. | 28/141 |
| 4,584,152 | 4/1986 | Leach. | |
| 4,600,045 | 7/1986 | Dudziak | 152/563 |
| 4,841,747 | 6/1989 | Frenzel et al.. | |
| 4,873,844 | 10/1989 | Frenzel et al.. | |
| 4,893,482 | 1/1990 | Frenzel et al.. | |
| 5,342,678 | 8/1994 | Ingus | 152/563 |

FOREIGN PATENT DOCUMENTS

| | | | |
|---|---|---|---|
| 1535645 | 2/1974 | Germany. | |
| 3723514 | 1/1989 | Germany | 152/563 |
| 4603 | 1/1983 | Japan | 152/563 |
| 59-195407 | 11/1984 | Japan. | |
| 61-43457 | 9/1986 | Japan. | |
| 63-48723 | 9/1988 | Japan. | |
| 4-14462 | 3/1992 | Japan. | |
| 5-11543 | 2/1993 | Japan. | |
| 280825 | 9/1970 | U.S.S.R.. | |

*Primary Examiner*—Steven D. Maki
*Attorney, Agent, or Firm*—Birch, Stewart, Kolasch & Birch, LLP.

[57] ABSTRACT

Tire fabrics for reinforcing rubber which includes warps having straight portions arranged in parallel with each other at predetermined intervals and wefts woven with the warps. Each weft comprises a pair of parallel portions and a V-shaped connecting portion. The V-shaped connecting portion is provided at the edge portion of the tire fabric.

4 Claims, 5 Drawing Sheets

TIRE INCLUDING TIRE FABRIC AND PLY INCLUDING TIRE FABRIC

BACKGROUND OF THE INVENTION

1. Field of the Invention

The present invention relates to tire fabrics for reinforcing rubber and more particularly to rubber, reinforced with tire fabrics and having the function of preventing concave areas from being generated at a region, of the tire side wall corresponding to a portion at which both ends of a carcass of tire are connected with each other. The present invention relates to a ply for tire-reinforcement comprising tire fabrics. The present invention also relates to a method of manufacturing rubber reinforced with tire fabrics.

2. Conventional Art

A pneumatic tire having a radial construction in which cords used as warps of the tire fabrics are disposed at right angles with the circumferential direction of the tire is manufactured in the following process. That is, a plurality of the cords parallel with each other is rubberized with topping rubber compounds, and the rubberized material is cut at a right angle with the extended direction of the cords to obtain a plurality of strips each having a predetermined length. In forming a carcass ply, two to 20 cords disposed at an edge portion on either side of one of the cut strips are overlapped on those disposed on an edge portion disposed on one side of two different cut strips to be connected with the cut strip. Then the carcass ply is rolled up. A belt layer, tread rubber, side wall rubber are layered on the outer face of the carcass ply and then, the tire that the above components have been layered on the carcass ply is cured in a mold.

Because the carcass ply is manufactured by the above-described method, the number of cords present in the strip-overlap portion is greater than that of cords present in other portions. Thus, per cord, elongation stress is small and thermal contraction is large and further, the strip-overlap portion has a great rigidity. Hence, when internal pressure is applied to a tire having the carcass ply, the strip-overlap portion is expanded less than other portions. As a result, portions of the side wall of the tire corresponding to strip-overlap portions are recessed and thus, the configuration of the tire itself becomes nonuniform and its commercial value deteriorates greatly.

Various inventions have been proposed to solve the above-described problems. For example, there is disclosed in Examined Japanese Utility Model Publication No. 4-14462, tire fabrics comprising specific elongative cords provided in the edge portion thereof; in Examined Japanese Patent Publication No. 63-48723, tire fabrics comprising polyester cords having a low contraction coefficient provided in the edge portion thereof; in Examined Japanese Patent Publication No. 61-43457, tire fabrics comprising warps having a high elongation coefficient and conventional warps arranged alternately in the edge portion; and in Japanese Laid-Open Patent Publication No. 5-154938, a method for preventing recesses from being generated on the side wall by a specific connecting tape provided in the strip-overlap portion.

In these inventions, attention is paid to the warps not to the weft. Thus, recesses are still generated to a great extent on the side wall of the tire although the tire comprises above-described devised warps, due to the reasons which will be described below. That is, these inventions are still incapable of reducing the generation of the recesses on the side wall to a required degree.

Referring to FIG. 6, a weft 1 of the conventional tire fabrics has a semicircular loop portion 1a at an edge portion thereof. A carcass ply is manufactured by overlapping other edge portions in which a weft is provided. However, the edge portions are overlapped with each other without considering the arrangement of the weft 1. Thus, it is rare that the loop portions 1a of one cut strip are arranged in line in an orderly manner between the loop portions 1a of another cut strip, as shown in FIG. 7. So actually, in the strip-overlap portion, the loop portions 1a disposed in the edge-portions of both cut strips overlap with each other, as shown in FIG. 8. Reference numeral 2 in FIGS. 6 through 8 denote a warp. In FIGS. 7 and 8, the carcass ply extends in a direction shown by an arrow (A).

In a radial tire comprising the carcass ply having strip-overlap portions as shown in FIG. 8, the warps 2 are arranged at right angles to the circumferential direction of the radial tire. Thus, when air is introduced into the tire during the manufacture thereof, the carcass ply is pulled in the extended direction (right-to-left direction in FIG. 8) of the weft 1 by the internal pressure of the tire. At this time, the semicircular loop portion 1a is pulled as well. As a result, the loop portion 1a which has been in a semicircular (approximately U-shaped) configuration becomes an approximately V-shaped configuration 1b, as shown by the dotted line in FIG. 9. FIG. 10 shows a pulled configuration of the loop portion 1a. In FIGS. 8 and 10, like elements are designated by like reference numerals.

In the change of the configuration of the loop portion 1a from the semicircular configuration to the V-shaped configuration 1b, the loop portion 1a of one cut strip which has overlapped the other cut strip starts to change earlier than the loop portion 1a' of the other cut strip. When the change starts, rubber disposed on the loop portion 1a becomes thin. As a result, the resistance of the loop portion 1a against the tensile force becomes small, and thus the loop portion 1a which has started to change to the V-shaped configuration 1b is further pulled. The loop portion 1a' in the edge portion of the other strip maintains its original configuration due to a reduced tensile force which acts on the loop portion 1a' caused by the change of the loop portion 1a from the semicircular configuration to the V-shaped configuration 1b. In this phenomenon, due to the movement of the loop portion 1a caused by the deformation thereof, wefts 21 and 22 connected with the loop portion 1a move together with the movement of the loop portion 1a from the position shown in FIG. 9 to the position shown in FIG. 10, thus generating a sparse portion, namely, a portion in which the interval between the adjacent warps 2 is comparatively long. In the loop portion 1a' the semicircular configuration is maintained, and the warps 2 do not move, thus generating an abundant portion, namely, a portion in which the interval between the adjacent warps 2 is comparatively short. As a result, when internal pressure is applied to the tire, the sparse portion is expanded, thus forming a convex portion on the side wall of the tire while the abundant portion forms recesses therein.

SUMMARY OF THE INVENTION

The present invention has been developed with a view to substantially solving the above described disadvantages and has for its object to provide improved tire fabrics for reinforcing rubber which are capable of reducing concaves on a side wall of a tire to a smaller degree when compared to conventional rubber reinforced with tire fabrics. Another object of the present invention is to provide a ply for tire-reinforcement comprising tire fabrics. A further object of the present invention is to provide a method of manufacturing tire fabrics for used for reinforcing rubber.

In order to achieve these and other objects, according to one aspect of the present invention, there is provided tire fabrics used for reinforcing rubber, before being cured, comprising a warp having straight portions arranged in parallel with each other at predetermined intervals and a weft woven with the warps, the weft comprising a pair of parallel portions adjacently arranged and having a V-shaped connecting portion, the connecting portion extending from an end of one of the parallel portions, and being inflected (bent) at one of the straight portions of the warp which is disposed in an edge portion of the tire fabrics for rubber reinforcement, and terminating at an end of the other of the parallel portions, the parallel portions and the V-shaped connecting portion being integrally formed.

By the above construction, the connecting portion of the tire fabrics is bent such that the connecting portion forms a V-configuration. When internal pressure is applied to a tire having a carcass ply comprising the connecting portion, the connecting portion is deformed in only a small amount, and hence is moved in only a small amount, thus reducing the movement amount of the warps disposed in the edge portion and allowing the movement amounts thereof to be uniform. That is, the connecting portion does not pull the warps with a great force, thus generating recesses on the side wall of the tire in a smaller degree compared to the conventional tire fabrics used for rubber reinforcement.

According to another aspect of the present invention, there is provided a ply for reinforcing a tire comprising strips formed by cutting the tire fabrics for rubber reinforcement into predetermined lengths which overlap each other, the tire fabrics for rubber reinforcement, before being cured, comprising a warp having straight portions arranged in parallel with each other at predetermined intervals and a weft woven with the warps, the weft comprising a pair of parallel portions arranged adjacently and a V-shaped connecting portion, the connecting portion extending from an end of one of the parallel portions, being inflected at one of the straight portions of the warp which is disposed in an edge portion of the tire fabrics for rubber reinforcement, and terminating at an end of the other of the parallel portions, the parallel portions and the V-shaped connecting portion being integrally formed.

According to another aspect of the present invention, there is provided a method of manufacturing tire fabrics for rubber reinforcement, before being cured, comprising the steps of:

arranging straight portions of a warp in parallel with each other at predetermined intervals; and weaving a weft comprising a pair of parallel portions by providing a connecting portion extending from an end of one of a pair of the parallel portions, inflecting the connecting portion of V-shaped configuration at one of the straight portion of the warp which is disposed at an edge portion of the tire fabrics for rubber-reinforce, and terminating at an end of the other of the parallel portions.

BRIEF DESCRIPTION OF THE DRAWINGS

These and other objects and features of the present invention will become clear from the following description taken in conjunction with the preferred embodiments thereof with reference to the accompanying drawings, which.

DETAILED DESCRIPTION OF THE EMBODIMENTS

Figure 1:
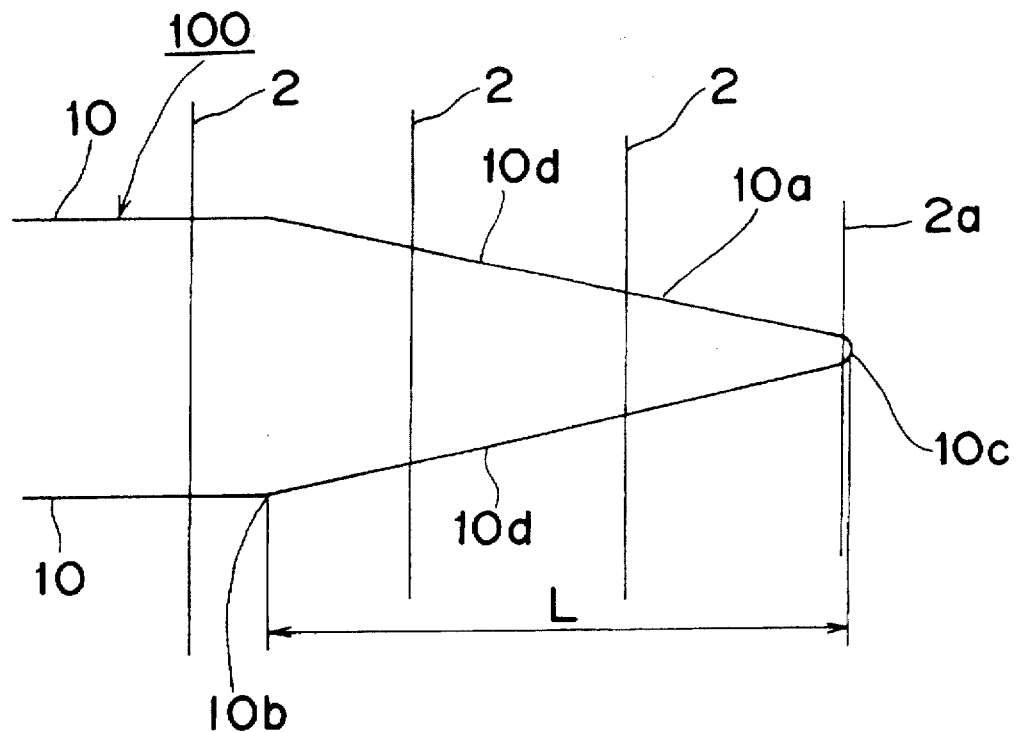
FIG. 1 is a view showing the configuration of a weft disposed in an edge portion of tire fabrics for rubber-reinforcement according to an embodiment of the present invention.
Figure 2:
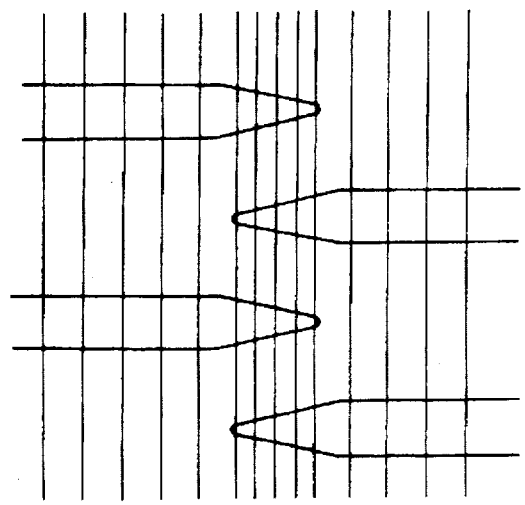
FIG. 2 is a view showing a bias joint portion of a carcass ply comprising the tire fabrics for rubber-reinforce shown in FIG. 1.

Before the description of the present invention proceeds, it is to be noted that like parts are designated by like reference numerals throughout the accompanying drawings.

Rubber reinforced with tire fabrics according to an embodiment of the present invention is described below with reference to FIGS. 1 through 4. FIG. 1 shows an edge portion of the tire fabrics comprising a pair of parallel portions 10 arranged adjacently and a connecting portion 10a which connects the parallel portions 10 with each other. Reference numeral 2 shown in FIG. 1 denotes a warp. Reference numeral 100 shown in FIG. 1 denotes a weft comprising the parallel portions 10 and the connecting portion 10a. The parallel portions 10 and the warps 2 are perpendicular to each other and woven with each other, with each of the parallel portions 10 and the connecting portion 10a disposed alternately on the rear and face of a drawing sheet of FIG. 1, similarly to fabrics of clothes. Ends of a pair of the parallel portions 10 are continuously connected with both ends of the connecting portion 10a and woven with the warps 2 zigzag, thus forming the tire fabrics. Although only one connecting portion 10a is shown in FIG. 1, in the edge portion of the tire fabrics, the connecting portion 10a having a configuration as shown in FIG. 1 is provided for each pair of the parallel portions 10.

Unlike conventional wefts, the connecting portion 10a is V-shaped as shown in FIG. 1. The connecting portion 10a is inflected at a warp 2a disposed at an edge of the tire fabrics for rubber reinforcement in the widthwise direction thereof. Preferably, the connecting portion 10a forms two inclined sides 10d substantially equal in length to an isosceles triangle. The connecting portion 10a with this configuration prevents the connecting portion 10a from being deformed in a large amount and hence prevents it from being moved in a larger amount than the conventional semicircular connecting portions of a pair of wefts, when internal pressure is applied to a carcass ply comprising tire fabrics for rubber reinforcement. Thus, the connecting portion 10a prevents the warp 2a connected with the connecting portion 10a from being moved and makes the movement amounts of the warps 2 uniform, thereby reducing the generation of convex portions and concave portions in the side wall of the tire.

An inflected portion 10c of the connecting portion 10a, namely, the tip portion of the V-shaped configuration or the tip portion of the isosceles triangle formed by the connecting portion 10a has a rounded portion.

Supposing that the number of the parallel portions provided for every 5cm-length in the extended direction of the warp 2 is "P", and the length from the intersection point 10b which is the end of the parallel portion 10, to the inflected portion 10c of the connecting portion 10a is "L"mm, the interval between the parallel portions 10 adjacent to each other and the length "L"mm are set such that the value of "P"×"L" is 100 or more and 700 or less. If the value of "P"×"L" is less than 100, the V-shaped connecting portion 10a is not much different in configuration and effect from the semicircular configuration of the inflected portion of the weft composing the conventional rubber-reinforcing tire fabrics described in the conventional art. If the value of "P"×"L" is more than 700, i.e., if "L" is too long, the connecting portion 10a does not form the V-shaped configuration as shown in FIG. 1, thus not providing a favorable effect. More advantageously, the value of "P"×"L" is in the range of 200 to 600.

Supposing that "P" is about 5 and "L" is about 100 mm, the interval between the adjacent parallel portions 10 is approximately 1 cm, and the entire width of the tire fabric is approximately 140 cm.

As for the material of the cords to compose the tire fabrics, rayon fiber, polyamide fiber, polyester fiber, aromatic polyamide fiber, etc. can be preferably used. These fibers can be used as the materials for reinforcing rubber products such as tires, belts or the like. Polyester is most favorable as the material for tires. Tire fabrics having connecting portion 10a, each made of one of these fibers, is used as material for reinforcing rubber products such as tires, belts or the like.

Tire fabrics having the connecting portions 10a are rubberized and cut at a substantially right angles with respect to the warps 2 to obtain a plurality of cut strips each having a predetermined width. Then the edge portions of the cut strips are connected to each other, with a predetermined number of cords overlapping each other. That is, the cut strips are connected with each other in the edge portions to form tire fabrics having a desired length. The thus obtained cut strips connected with each other are wound around a roll and reserved as a material to be molded into a carcass ply of a tire or a belt ply thereof. The portion in which the edge portions thereof are overlapped with each other is the so-called a bias joint portion.

A test result obtained by inspecting bias joint portions of tires manufactured by using the carcass ply having tire fabrics with the connecting portion 10a is shown as follows. A size of the tires used in the test is "195/70R14". In order to conduct the test in a severe condition, the size of rim used in the test is wider by one inch than that of a rim used for the tire of the above size, and the internal pressure of each tire is set to be greater by 1.0 kg/cm² than that to be applied to the tire of the above size. That is, the size of the rim is 6.5×14, and the internal pressure of the each tire is set to 3 kg/cm².

In addition to the bias joint, a tire has a mold joint formed in molding the tire. Thus, it is necessary to distinguish the bias joint and the mold joint from each other. In the test, the bias joint is specified as follows: In the case of tires manufactured by the applicant's company, the bias joint is marked in molding. In the case of tires manufactured by other companies, the following method is used to distinguish from each other three kinds of joints, namely, an inner liner joint, the bias joint, and the mold joint which can be detected from the inner side of the tire. The position of the inner liner joint can be concluded based on the thickness of a joint portion. In tires of the same size and the same pattern, the mold joint is present in the same distance with respect to the position of the inner liner joint concluded as described above. Thus, the position of the mold joint can be concluded. Accordingly, the position of the bias joint can be concluded.

In order to evaluate bias joint portions, the degree of convexes and concaves of a side wall of each tire, on the outer side thereof, corresponding to each bias joint portion is inspected by visual and touch observation. The results thus obtained are compared with samples serving as the evaluation reference so as to give one value of evaluation values 1.0 (bad)–5.0 (good) for each bias joint portion.

Figure 3:
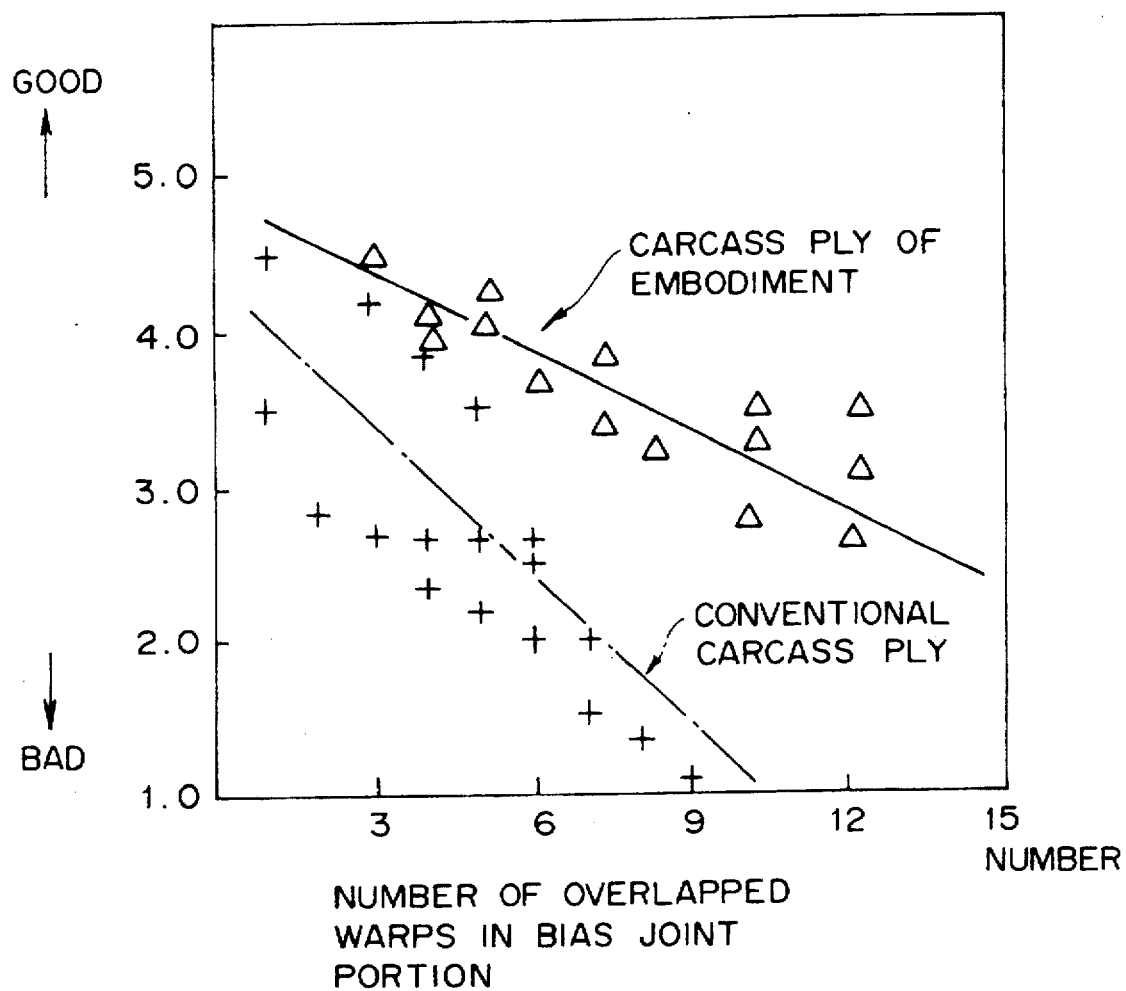
FIG. 3 is a graph showing the change of evaluation values with respect to the change of a number of warps overlapping each other at bias joint portions in a conventional carcass ply and in the carcass ply as shown in FIG. 2.

FIG. 3 is a graph showing the relationship between the evaluation values and the number of warps 2 overlapping each other in each bias joint portion in the carcass ply comprising the conventional semicircular loop type weft and in the carcass ply comprising the connecting portion 10a according to the embodiment. The result obtained in the case of the bias joint portion of the conventional carcass ply is plotted by "+" and that obtained in the case of the bias joint portion of the carcass ply according to the embodiment is plotted by "Δ".

As apparent from FIG. 3, regardless of the number of warps overlapping each other, the bias joint portions of the carcass ply according to the embodiment have higher evaluation values than those of the conventional carcass ply. That is, the former allows the side wall of each tire to have fewer convexes and concaves than the latter does.

Figure 4:
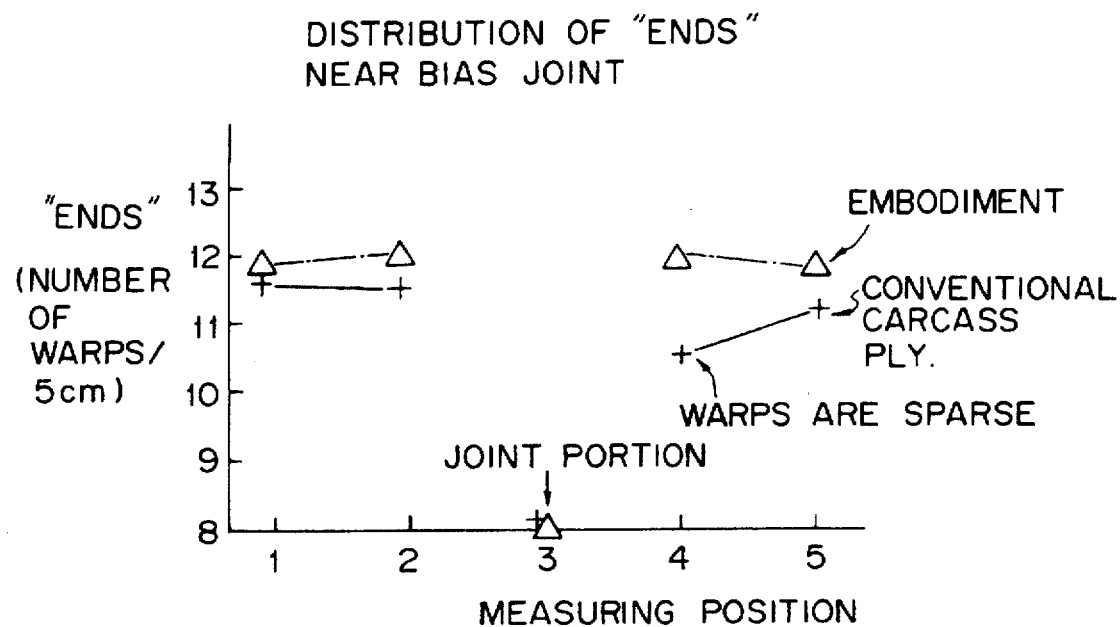
FIG. 4 is a graph showing the distribution of warps at each of measuring positions "1" through "5" shown in FIG. 5 in bias joint portion.
Figure 5:
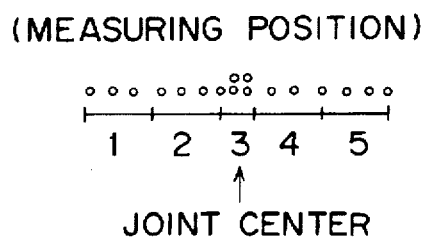
FIG. 5 is a view for describing the measuring positions shown in FIG. 4.
Figure 6:
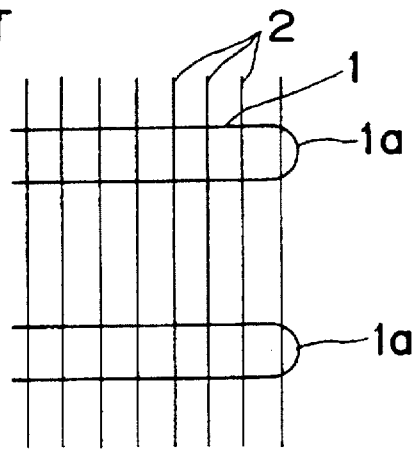
FIG. 6 is a view showing the configuration of weft disposed in an edge portion of conventional tire fabrics for rubber-reinforce.
Figure 7:
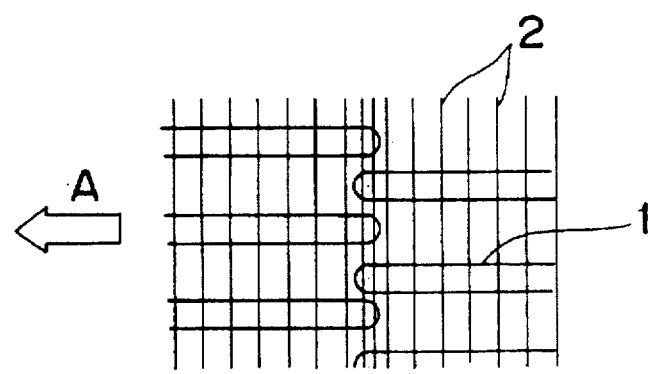
FIG. 7 is a view showing an ideal bias joint portion of a carcass ply comprising the tire fabrics for rubber-reinforce shown in FIG. 6.
Figure 8:
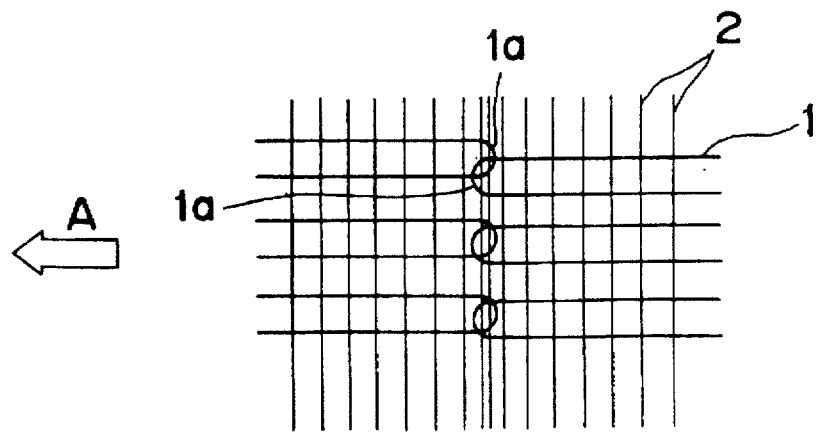
FIG. 8 is a view showing an actual bias joint portion of the carcass ply comprising the tire fabrics for rubber-reinforce shown in FIG. 6.
Figure 9:
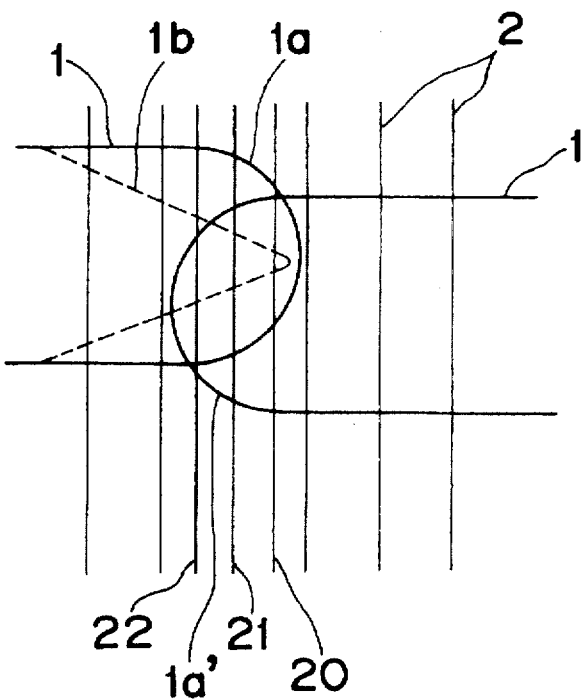
FIG. 9 is a view showing a state in which an internal pressure is applied to the carcass ply shown in FIG. 8.
Figure 10:
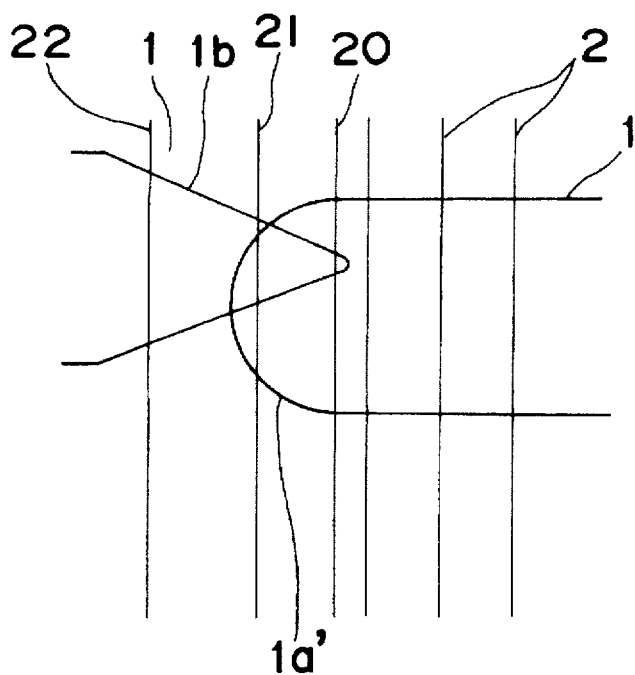
FIG. 10 is a view showing a state brought about subsequently to the state in which the internal pressure is applied to the carcass ply shown in FIG. 8.

FIG. 4 shows a "ends" distribution at each of measuring positions "1" through "5" in the bias joint portion. The "ends" means the number of the warps 2 contained in every 5 cm length at the longitudinal direction of the carcass ply. The results in the case of the conventional carcass ply are plotted by "+", while the results in the case of the carcass ply according to the embodiment are plotted by "Δ". The measuring positions "1" through "5" are determined as follows in the longitudinal direction of the carcass ply, with the center of the bias joint portion set as the reference point: A range of between –2 mm and +2 mm is set to "3", a range of between +2 mm and +17 mm is set to "4", a range of between –2 mm and –17 mm is set to "2", a range of between +17 mm and +32 mm is set to "5", and a range of between –17 mm and –32 mm is set to "1".

As apparent from FIG. 4, in the conventional carcass ply, the warps 2 are sparsely present at the measuring position "4" while in the carcass ply according to the embodiment, the warps 2 are not sparsely present at the measuring position "4".

Table 1 shows evaluations such as evaluation values for convex and concave formed on the side wall, the "ends" distribution, weight, "uniformity", and the like in three examples, namely, the value of "P"×"L" is 80 (example "a"), 400 (example "b"), and 800 (example "c"). Weight and "uniformity" are indicated by an index number in comparison with index 100 corresponding to the weight and "uniformity" of the conventional carcass ply. If the index number of weight and "uniformity" of the carcass ply according to the embodiment is less than 100, the carcass ply according to the embodiment is superior to the conventional one. "Uniformity" means an index number showing the degree of dispersion of convex and concave formed on the side wall inspected when the tire is rotated. As shown in Table 1, each item of the carcass ply according to the embodiment is not much different from that of the conventional one when the value of "P"דL" is 80 and 800, whereas each item of the former is superior to that of the conventional one when the value of "P"דL" is 400.

TABLE 1

|  | Conventional carcass ply | example "a" | example "b" | example "c" |
|---|---|---|---|---|
| C | 50 | 50 | 50 | 50 |
| P | 4 | 2.5 | 4 | 4 |
| L | — | 32 | 100 | 200 |
| P × L | — | 80 | 400 | 800 |
| B | 3 | 3 | 3 | 3 |
| E | 3.5 | 4.0 | 4.5 | 3.5 |
| D | 0.6 | 0.4 | 0.2 | 0.6 |
| Weight (index) | 100 | 93 | 94 | 94 |
| Uniformity (index) | 100 | 94 | 90 | 100 |

In the above, "C" is the number of warps per 5 cm; "P" is the number of parallel portions per 5 cm; "L" is the length ("L"mm) of connecting portion; "B" is the number of warps in bias joint portion; "E" is the evaluation for degree of convex and concave formed on side wall; and "D" is the maximum-minimum number of warps at both sides of the joint portion.

In the conventional tire fabrics, the inflected portion of a pair of parallel portions is semicircular. This configuration allows the weft to be moved easily and greatly and thus the warps to be moved easily and further, the movement amounts of the warps to be nonuniform. In the tire fabrics according to the embodiment, the V-shaped connecting portion connects the pair of parallel portions with each other. The V-shaped connecting portion is deformed at the inflected portion thereof in a small degree. Further, when internal pressure is applied to the carcass ply, the connecting portions in the bias joint portions are prevented from being deformed to a great extent. In addition, the movement amounts of the warps can be allowed to be uniform even though they are moved. That is, the deformation amount of each of the parallel portion and the connecting portion is allowed to be small and hence, the warps are not moved easily. Accordingly, the tire fabrics according to the embodiment can prevent recesses from being generated in a large quantity on the side wall of a tire in comparison with the conventional tire fabrics.

In the tire fabrics according to the embodiment, the "ends" on one side of the bias joint portion of the carcass ply in the longitudinal direction thereof can be allowed to be almost equal to the "ends" on the other side of the bias joint portion.

Further, it is difficult that the "ends" becomes sparse even though the bias joint portion is present in the vicinity of the joint or the mold joint of the side wall of the tire.

In order to prevent the generation of portions in which the warps are sparse or dense, according to the conventional art, a topping gauge is set to a great thickness, whereas according to the embodiment, the generation of such portions can be prevented. Accordingly, the topping gauge can be set to small thickness. Therefore, a light carcass ply and hence a light tire can be manufactured.

As described above, according to the tire fabrics according to the embodiment, the V-shaped connecting portion connects the pair of parallel portions with each other, unlike the conventional semicircular inflected portion of weft. Accordingly, the V-shaped connecting portion is deformed at the inflected portion thereof in small degree. Further, when internal pressure is applied to the tire having the carcass ply, the weft in the bias joint portion is prevented from being deformed to a great extent. In addition, the movement amounts of the warps can be allowed to be uniform even though they are moved. That is, the deformation amount of each weft is allowed to be small and hence, the warps are not moved easily. Therefore, the tire fabrics according to the present invention can prevent recesses from being generated in a large quantity on the side wall of the tire.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A tire containing a plurality of tire-reinforcing fabrics overlapping each other, each said fabric comprising warps, said warps extending in the axial direction of the tire, each of said warps having straight portions arranged in parallel with each other at predetermined intervals, and a weft woven zigzag with said warps, the weft comprising first, second and third parallel portions arranged adjacently and first and second connecting portions, the first connecting portion extending straightly from one end of the first parallel portion, inflecting at one of the straight portions of the warps which is disposed in one edge portion of the tire fabric, and then extending straightly toward one end of the second parallel portion, and terminating at one end of the second parallel portion, such that the first connecting portion is V-shaped and the straight portions of the warps which are disposed at the first connecting portion are prevented from moving at the first connecting portion, the second connecting portion extending straightly from the other end of the second parallel portion, inflecting at one of the straight portions of the warps which is disposed in another portion of the tire fabric and then extending straightly toward one end of the third parallel portion, and terminating at the one end of the third parallel portion, such that the second connecting portion is V-shaped and the straight portions of the warps which are disposed at the second connecting portion are prevented from moving at the second connecting portion, said first, second and third parallel portions and the V-shaped connecting portions being integrally formed, wherein the number of the parallel portions of the weft provided for every 5 cm-length in an extended direction of the straight portion of the warp defines P, the shortest length in mm from a connection point where the end of each of said first, second and third parallel portions is connected to the connecting portion, to an inflection point of the connecting portion defines L, and a value of P×L is in a range from 100 to 700.

2. The tire of claim 1, wherein
the value of P×L is in a range of 200 to 600.

3. A ply for reinforcing tires comprising a plurality of rubberized strips of tire fabric, said strips having predetermined lengths and overlapping each other so as to define a joint portion, each said tire fabric comprising warps having straight portions arranged in parallel with the joint portion and with each other at predetermined intervals and a weft woven zigzag with the warps, said weft comprising first, second and third parallel portions arranged adjacently and first and second connecting portions, said first connecting portion extending straightly from one end of the first parallel portion, inflecting at one of the straight portions of the warp, which is disposed in an edge portion of the tire fabric and then extending straightly toward one end of the second parallel portion, and terminating at the one end of the said second parallel portion, such that the first connecting portion is V-shaped and the straight portions of the warps which are disposed at the first connecting portion are prevented from moving at the first connecting portion, the second connecting portion extending straightly from the other end of the second parallel portion, inflecting at one of the straight portions of the warps which is disposed in another portion of the tire fabric and then extending straightly toward one end of the third parallel portion, and terminating at the one end of the third parallel portion, such that the second connecting portion is V-shaped and the straight portions of the warps which are disposed at the second connecting portion are prevented from moving at the second connecting portion, said first, second and third parallel portions and the V-shaped connecting portions being integrally formed, wherein in the tire fabric, the number of the parallel portions of the weft provided for every 5 cm-length in an extended direction of each straight portion of the warp defines P, the shortest length in mm from a connection point where the end of each of said first, second and third parallel portions is connected to the connecting portion, to an inflection point of the connecting portion defines L, and a value of P×L is in a range from 100 to 700.

4. The ply as claimed in claim 3, wherein the value of P×L is in a range from 200 to 600.

* * * * *